(12) United States Patent
Hung

(10) Patent No.: US 7,207,537 B2
(45) Date of Patent: Apr. 24, 2007

(54) SUPPORT APPARATUS FOR SUSPENDING A DISPLAY

(76) Inventor: Chin-Jui Hung, No. 11-2, Wu-Nan Rd., Wu-Chi Chen, Taichung Hsien (TW)

( * ) Notice: Subject to any disclaimer, the term of this patent is extended or adjusted under 35 U.S.C. 154(b) by 189 days.

(21) Appl. No.: 11/014,176

(22) Filed: Dec. 17, 2004

(65) Prior Publication Data

US 2005/0230585 A1 Oct. 20, 2005

(30) Foreign Application Priority Data

Apr. 19, 2004 (TW) .............................. 93206030 U

(51) Int. Cl.
*E04G 3/00* (2006.01)

(52) U.S. Cl. .............................. 248/284.1; 248/274.1; 248/276.1; 248/919; 248/920; 248/921

(58) Field of Classification Search ............. 248/284.1, 248/281.11, 276.1, 278.1, 282.1, 280.11, 248/558, 917, 919, 921, 922
See application file for complete search history.

(56) References Cited

U.S. PATENT DOCUMENTS

| | | | | |
|---|---|---|---|---|
| 2,907,598 A | * | 10/1959 | Hart | 287/58 |
| 3,041,034 A | * | 9/1962 | Wilkinson | 248/284.1 |
| 4,852,842 A | * | 8/1989 | O'Neill | 248/284.1 |
| 5,743,503 A | * | 4/1998 | Voeller et al. | 248/284.1 |
| 5,799,917 A | * | 9/1998 | Li | 248/284.1 |
| 5,992,809 A | * | 11/1999 | Sweere et al. | 248/278.1 |
| 6,012,693 A | * | 1/2000 | Voeller et al. | 248/280.11 |
| 6,076,785 A | * | 6/2000 | Oddsen, Jr. | 248/118.3 |
| 6,289,661 B1 | * | 9/2001 | Boland | 57/58.63 |
| 6,304,719 B1 | * | 10/2001 | Mo | 392/376 |
| 6,409,134 B1 | * | 6/2002 | Oddsen, Jr. | 248/274.1 |
| 6,446,924 B1 | * | 9/2002 | Olson | 248/280.11 |
| 6,695,270 B1 | * | 2/2004 | Smed | 248/274.1 |
| 6,736,364 B2 | * | 5/2004 | Oddsen, Jr. | 248/585 |
| 6,769,657 B1 | * | 8/2004 | Huang | 248/278.1 |
| 6,857,610 B1 | * | 2/2005 | Conner et al. | 248/284.1 |
| 2001/0047719 A1 | * | 12/2001 | Niwa et al. | 92/153 |
| 2003/0075658 A1 | * | 4/2003 | Beissel et al. | 248/284.1 |
| 2004/0084587 A1 | * | 5/2004 | Oddsen | 248/284.1 |
| 2004/0159757 A1 | * | 8/2004 | Pfister | 248/284.1 |
| 2005/0121578 A1 | * | 6/2005 | Asamarai et al. | 248/284.1 |

* cited by examiner

*Primary Examiner*—Carl D. Friedman
*Assistant Examiner*—Bradley Duckworth
(74) *Attorney, Agent, or Firm*—Troxell Law Office, PLLC

(57) ABSTRACT

A support apparatus for suspending a display has a holder with a first end pivotally mounted on a ceiling, an arm pivotally connected to a second end of the holder, a redirector pivotally mounted on the arm, and a seat pivotally mounted on the redirector. Whereby, a display secured on the seat can be easily and smoothly adjusted in a wide extent.

8 Claims, 8 Drawing Sheets

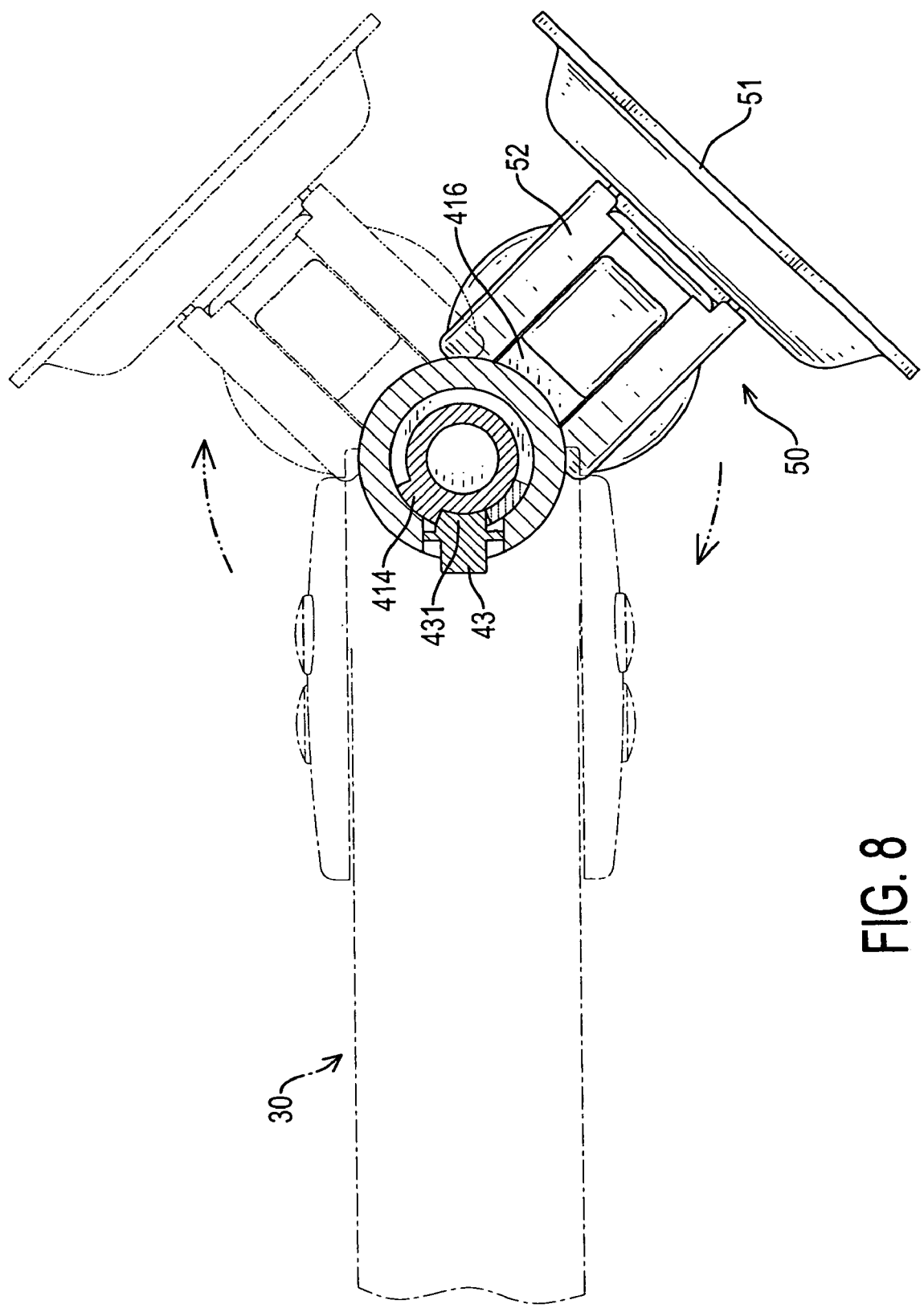

SUPPORT APPARATUS FOR SUSPENDING A DISPLAY

BACKGROUND OF THE INVENTION

1. Field of the Invention

The present invention relates to a support apparatus, and more particularly to a support apparatus which can suspend a visual media display.

2. Description of Related Art

A display such as a television can be laid at a low location in a home for convenient viewing by the family, etc. However, as a terminal server for spreading information in a public location such as a hospital, the display should be disposed at a high position to enable all the nearby people whether standing or sitting to watch it.

A conventional support apparatus for suspending the display has a post which is perpendicular to a ceiling. A top end of the post is securely provided on the ceiling and a lower end of the post has a seat pivotally mounted thereon and to which the display is disposed. Because the conventional display or TV set has a large weight, the seat is directly mounted on the post for stably supporting the display. Therefore, the display is adjustable only in a limited extent.

Nowadays, lightweight displays such as an LCD (Liquid Crystal Display) have become widely used, so that the conventional support apparatus for suspending the display, which will limit the adjusting range of the display, is not suitable for the LCD or other lightweight displays.

Therefore, the invention provides a support apparatus for suspending the display to mitigate or obviate the aforementioned problems.

SUMMARY OF THE INVENTION

The main objective of the present invention is to provide a support apparatus for suspending a display and with which it is easy to adjust the position of the display in a wide extent.

Other objectives, advantages and novel features of the invention will become more apparent from the following detailed description when taken in conjunction with the accompanying drawings.

BRIEF DESCRIPTION OF THE DRAWINGS

FIG. 8 is another operational top sectional view of the redirector of the support apparatus along line 8—8 in FIG. 1.

DETAILED DESCRIPTION OF THE PREFERRED EMBODIMENT

Figure 1:
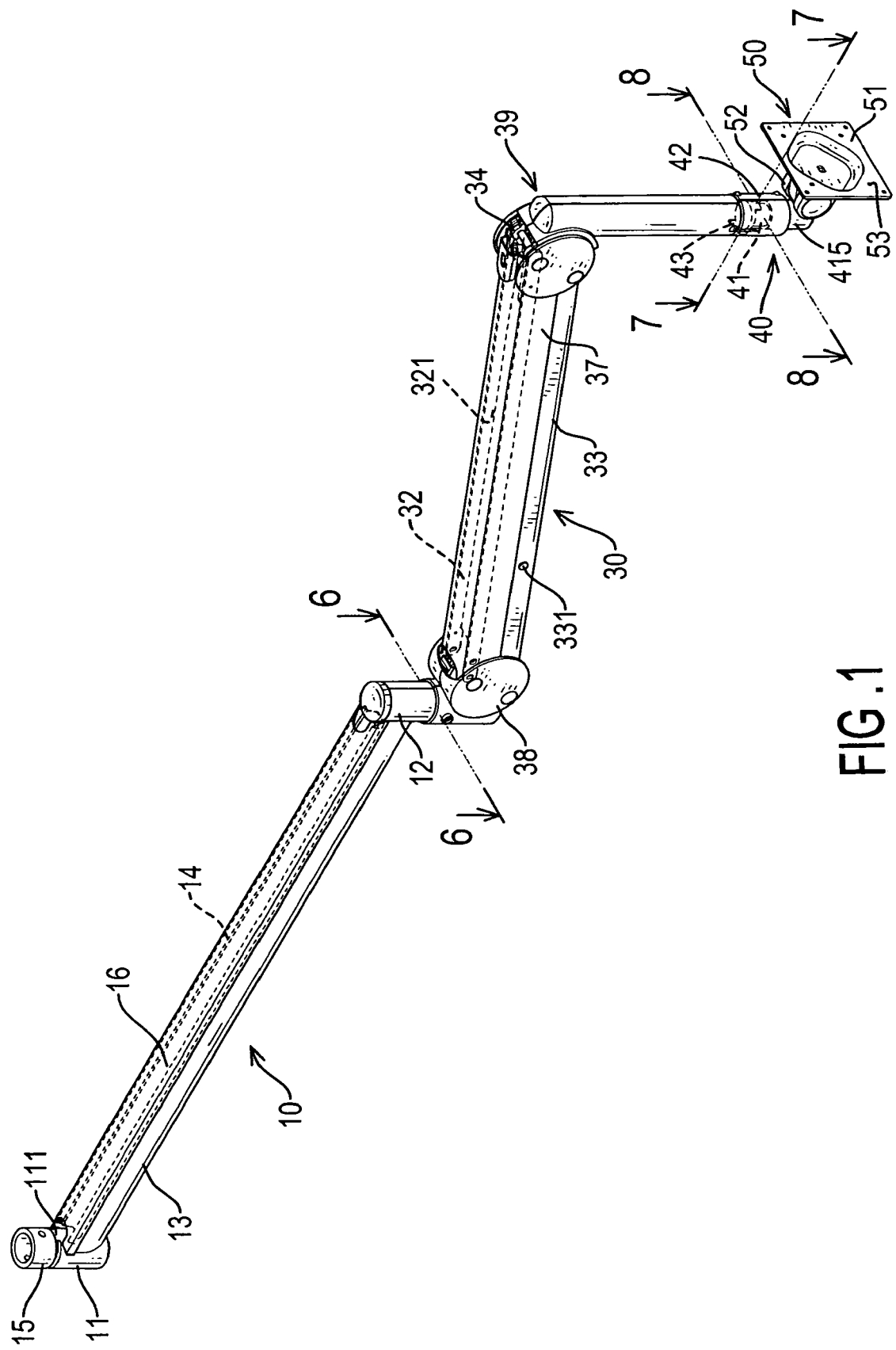
FIG. 1 is a perspective view of a support apparatus for suspending a display in accordance with the present invention.
Figure 2:
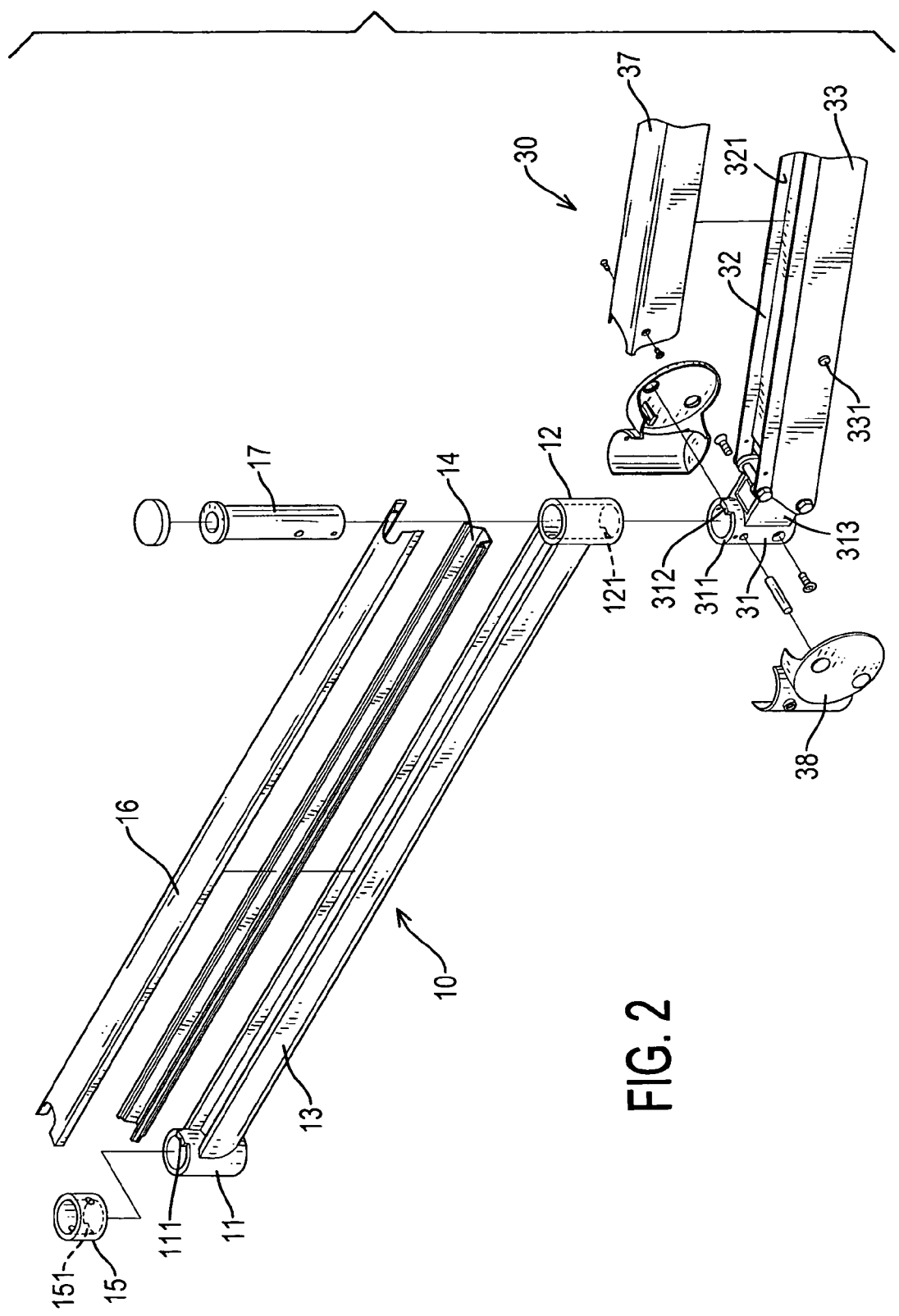
FIG. 2 is a partially exploded perspective view of the support apparatus in accordance with the present invention.
Figure 3:
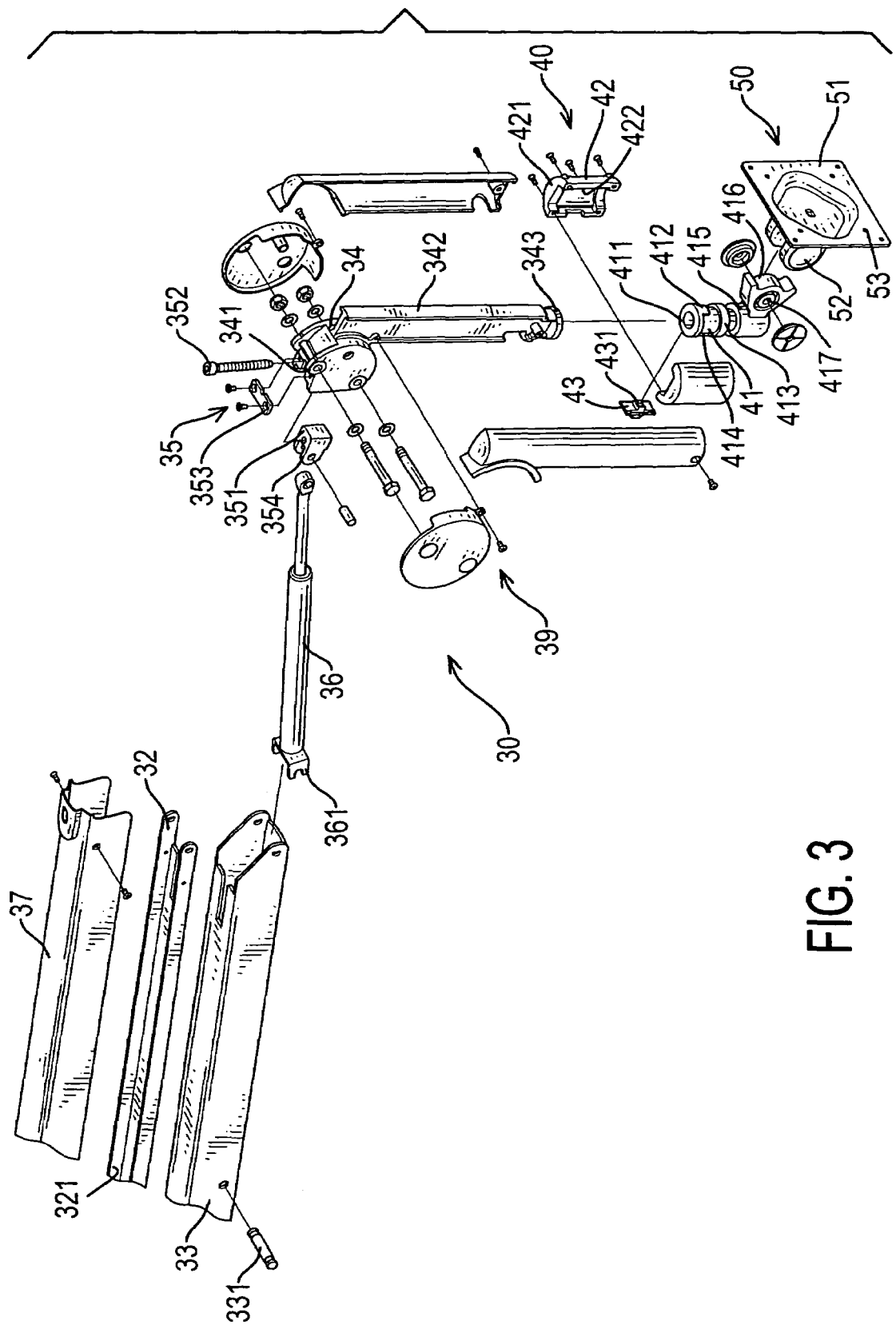
FIG. 3 is another partially exploded perspective view of the support apparatus in accordance with the present invention.
Figure 4:
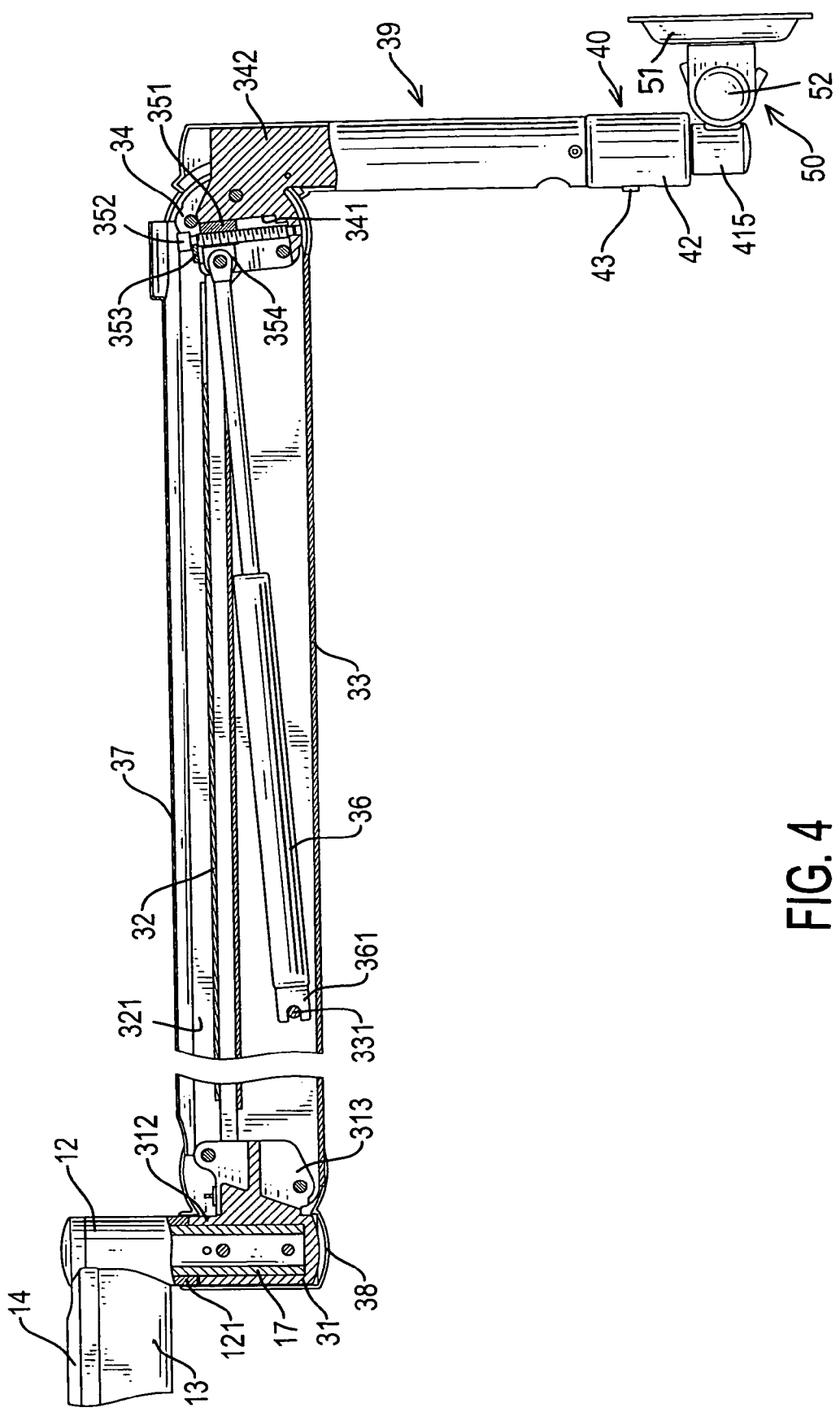
FIG. 4 is a partially sectional view of the support apparatus in accordance with the present invention.

With reference to FIGS. 1–4, a support apparatus for suspending a display comprises a holder (10), an arm (30), a redirector (40) and a seat (50).

The holder (10) has a rod (13), and a first barrel (11) and a second barrel (12) are respectively provided on two opposed ends of the rod (13). A first lug (111) is formed on a top circumference of the first barrel (11) and adjacent to the rod (13). A cylinder (15) is mounted on the first barrel (11), and a second lug (151) is formed on a lower outer circumference of the cylinder (15) and opposed to the first lug (111). It is noted that after the cylinder (15) is received in the first barrel (11), the second lug (151) is selectively connected to and stopped by the first lug (111) when the cylinder (15) is pivoted relative to and inside the first barrel (11). The first barrel (11) and the cylinder (15) are pivotally mounted on a base in a ceiling.

A third lug (121) is formed on a lowermost periphery of the second barrel (12) and adjacent to the rod (13). A wire bracket (14) is provided in the rod (13) for receiving wires and covered with a first cap (16). The first cap (16) has two first notches respectively defined in two opposed ends thereof.

The arm (30) has a first connector (31), an upper beam (32), a lower beam (33), a second connector (34), an adjuster (35) and a shank (36).

The first connector (31) has a tube (311) pivotally mounted under the second barrel (12) by an axle (17) of which a lower end is fastened on the tube (311). A fourth lug (312) is formed on a top circumference of the tube (311) and opposed to the third lug (121).

A joint (313) is formed on an outer periphery of the tube (311) and adjacent to the fourth lug (312). The upper beam (32) and the lower beam (33) are parallel to each other and are pivotally connected between the joint (313) and the second connector (34), so the upper beam (32), the joint (313), the lower beam (33) and the second connector (34) form a rectangular structure when combined. A channel (321) for receiving the wire is longitudinally defined in the upper beam (32), and is covered with a second cap (37). The cap (37) has two holes respectively defined at two opposed end thereof, and a second notch defined at a rear end adjacent to the first connector (31).

The second connector (34) is defined with a chamber (341) with a top opening and a lateral opening facing the lower beam (33). A shaft (342) extending downwards from a side of the second connector (34) opposed to the first connector (31) is integrally formed with the second connector (34). A ring (343) is formed on a lower end of the shaft (342).

The adjuster (35) has a block (351) with two first ears (354) received in the chamber (341). A finger (353) is fastened on a top of the second connector (34) via screws (not numbered), and a bolt (352) is extending through a peripheral side face of the finger (353) and into the block (351) so as to fasten the block (351) on the adjuster (35).

The shank (36) has a front end pivotally connected between the ears (354) of the block (351), and a tail (361) is formed at a rear end of the shank (36) and pivotally mounted in a middle portion of the lower beam (33) by a pivotal pin (331). The shank (36) can be a pneumatic cylinder or hydraulic cylinder.

The first connector (31) is covered with a first shield (38) being composed of two matched first semi-shields (not numbered); and the second connector (34) is covered with a second shield (39) being composed of two matched second semi-shields (not numbered).

The redirector (40) has a post (41), a shell (42) and a button (43). The post (41) is attached to a lower end of the shaft (342), and has an upper collar (411) formed at a top of the post (41), and a lower collar (413) formed at an outer periphery of the post (41) and under the upper collar (411). A first protrusion (412) extends from a lower side of the upper collar (411) downwards along the outer periphery of the post (41) with a length equal to the half distance between the first and second collars (411, 413). A second protrusion (414), opposed to the first collar (412), extends from a top side of the lower collar (413) upwards along an outer periphery of the post (41) with a length equal to the half distance between the first and second collars (411, 413).

The post (41) has a lower portion (415) with a large outer diameter and a foot (416) extending from the lower portion (415). An aperture (417) is transversely defined in the foot (416). Two wings are respectively formed at top and bottom ends of the foot (416).

The shell (42) is composed of two matched semi-tubular parts and the post (41) is received into the shell (42). The shell (42) has a first rim (421) formed on a top thereof, and a second rim (422) formed on a bottom thereof. The first rim (421) is located on the ring (343) to clasp the shaft (342), and the lower collar (413) is located on the second rim (422) to clasp the post (41).

The post (41) is rotatably mounted in the shell (42), and the lower portion (415) extends downwards from the shell (42). The button (43) is movably provided on an outer circumference of the shell (42) and adjacent to the arm (30). A stop (431) is formed on an inner side of the button (43) and abuts against the outer periphery of the post (41). A length of the stop (431) is approximately equal to the length of the first or the second protrusion (412, 414).

The seat (50) has a panel (51) and two second ears (52) formed at a rear side of the panel (51). The second ears (52) are pivotally mounted in the apertures (417) of the foot (416). Multiple threaded holes (53) are defined through the panel (51).

In another preferred embodiment, the redirector (40) is eliminated, and the seat (50) is directly provided on the second connector (34).

Figure 5:
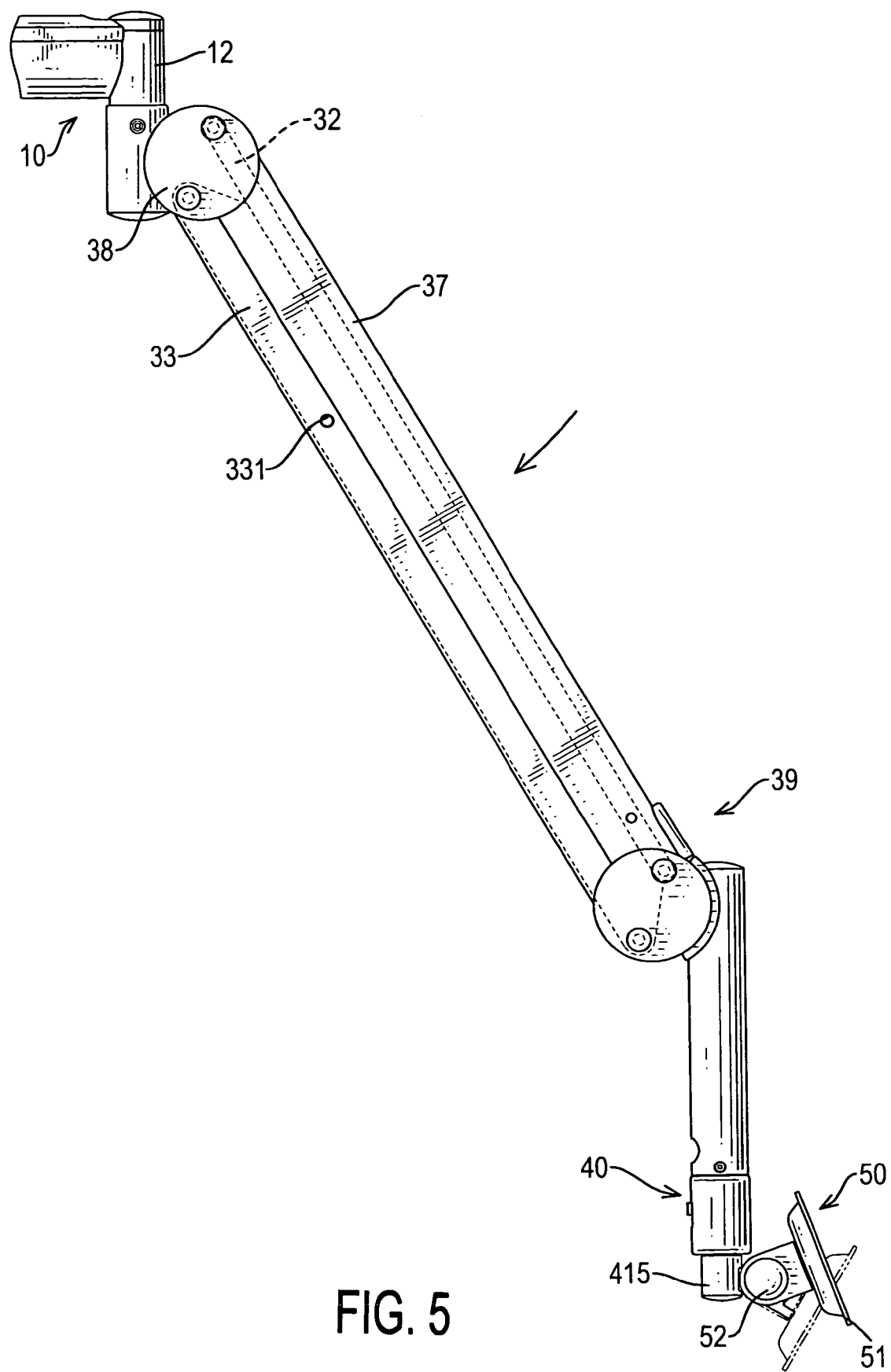
FIG. 5 is a side view of an arm of the support apparatus in accordance with the present invention in usage.
Figure 6:
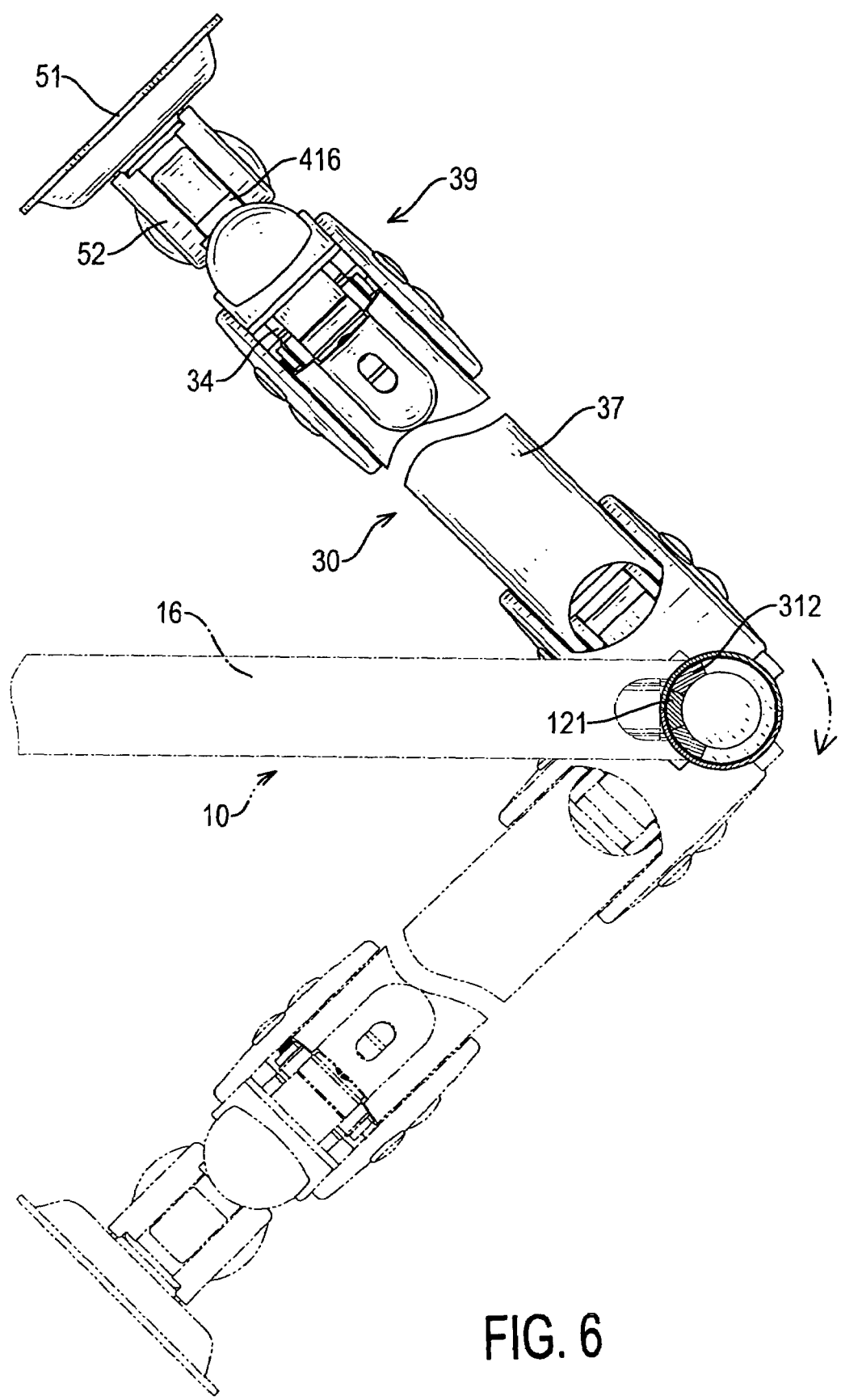
FIG. 6 is an operational top view in partial cross section of the arm of the support apparatus along line 6—6 in FIG. 1.
Figure 7:
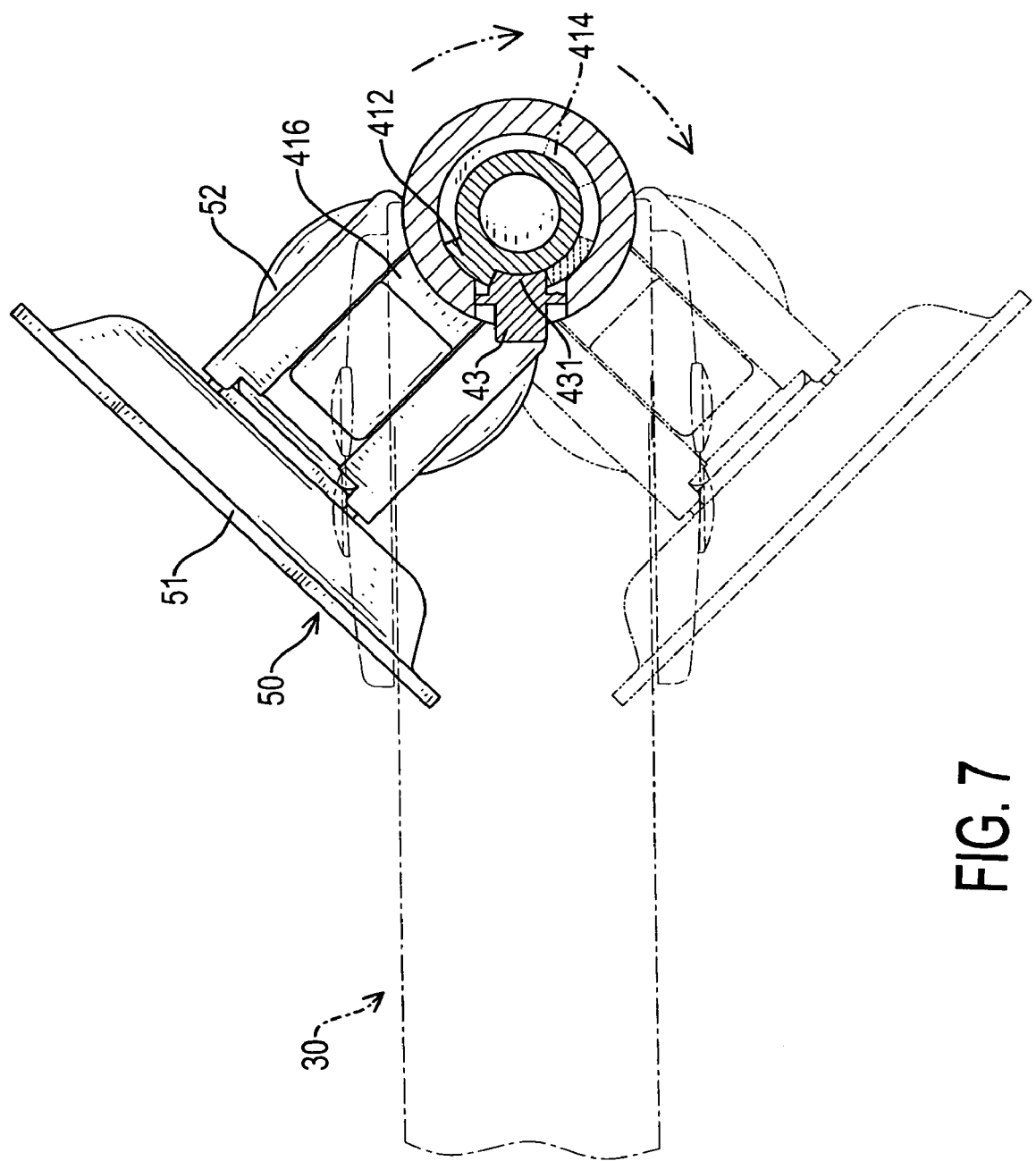
FIG. 7 is an operational top sectional view of a redirector of the support apparatus along line 7—7 in FIG. 1.

With reference to FIGS. 5–8, the arm (30) can be turned left and right about the axle (17), and the beams (32, 33) can be pivoted upwards and downwards about the first connector (31). The post (40) can be turned left and right about the shaft (342), and the seat (50) can be turned upwards and downwards. Therefore, a display on the seat (50) can be easily adjusted in a wide extent.

With reference to FIGS. 1–3 and 6, the first lug (111) in the holder (10) corresponds to the second lug (151) in the cylinder (15), and the third lug (121) in the second barrel (12) is relative to the fourth lug (312) in the first connector (31), so that the holder (10) and the arm (30) are adjustable in limited ranges, and cannot not be turned excessively, thereby eliminating the risk of damaging the supporting arm or the display.

Because the shank (36) is a hydraulic cylinder or a pneumatic cylinder, the arm (30) can provide a buffer force for supporting the display, and the support apparatus has a good stability and flexibility. By turning the bolt (352), the block (351) is moved along the bolt (352) to change an angle of the shank (36) in the arm (30), Accordingly, an angle of the arm (30) about the holder (10) is also changed.

With reference to FIGS. 2–3 and 7–8, when the button (43) is in an upper position while the post (41) is turned, the first protrusion (412) will abut the stop (431) to prevent the seat (50) from turning excessively. Similarly, when the button is in a lower position while the post (41) is turned, the second protrusion (414) will abut the stop (431) to prevent the seat (50) from turning excessively.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A support apparatus for suspending a display comprising:
    a holder (10) having a rod (13) with a first end adapted to be pivotally mounted on a ceiling and a second end opposed to the first end;
    an arm (30) having a first connector (31) provided at a first end of the arm (30) and pivotally connected to the second end of the holder (10), a second connector (34) provided at a second end of the arm (30), an upper beam (32) and a lower beam (33) pivotally mounted between the first connector (31) and the second connector (34) and parallel to each other, an adjuster (35) adjustably mounted in the second connector (34), and a shank (36) with a first end pivotally mounted on the adjuster (35) and a second end pivotally mounted on the lower beam (33);
    a redirector (40) provided between the arm (30) and the seat (50), wherein the second connector (34) has a shaft (342) extending downwards from the second connector (34); the redirector (40) has a shell (42) mounted at a lower end of the shaft (342), a post (41) rotatably received in the shell (42) and having at least one protrusion formed on an outer periphery of the post (41), and a lower portion (415) of the post (41) extending out from the shell (42), and a button (43) provided in the shell (42) and formed with a stop (431) abutting the outer periphery of the post (41); and the seat (50) is pivotally mounted on the lower portion (415) of the redirector (40), and
    a seat (50) mounted on the second connector (34),
    wherein the second connector (34) has a chamber (341) facing the first end of the shank (36), the adjuster (35) has a block (351) received in the chamber (341), a finger (353) mounted on the second connector (34) and a bolt (352) extending through the finger (353) and engaged in the block (351), and the first end of the shank (36) is pivotally mounted in the block (351),
    wherein the holder (10) has a first barrel (11) formed at the first end of the holder (10), a first lug (111) formed at a top circumference of the first barrel (11), a cylinder (15) secured on the ceiling and pivotally mounted with the first barrel (11), a second lug (151) formed at a lower circumference of the cylinder (15) and opposed to the first lug (111), a second barrel (12) formed at the second end of the holder (10), and a third lug (121) formed at a lower circumference of the second barrel (12); and the first connector (31) has a tube (311) rotatably mounted on the second barrel (12) by an axle

(17) and a fourth lug (312) formed at a top circumference of the tube (311) and opposed to the third lug (121).

2. The support apparatus as claimed in claim 1, wherein the holder (10) has a wire bracket (14) provided in the rod (13), and a channel (321) is longitudinally defined in the upper beam (32).

3. The support apparatus as claimed in claim 2 wherein the wire bracket (14) is covered with a first cap (16) and the channel (321) is covered with a second cap (37).

4. The support apparatus as claimed in claim 3 wherein the post (41) has a foot (416) formed on a lower portion (415), and the seat (50) is pivotally mounted on the foot (416).

5. The support apparatus as claimed in claim 4 wherein the shank (36) is a hydraulic cylinder.

6. The support apparatus as claimed in claim 4 wherein the shank (36) is a pneumatic cylinder.

7. A support apparatus for suspending a display comprising:
   a holder (10) having a rod (13) with a first end engageable with a ceiling and a second end opposed to the first end;
   an arm (30) having a first connector (31) provided at a first end of the arm (30) and pivotally connected to the second end of the holder (10), a second connector (34) provided at a second end of the arm (30), an upper beam (32) and a lower beam (33) pivotally mounted between the first connector (31) and the second connector (34) and parallel to each other, an adjuster (35) adjustably mounted in the second connector (34), and a shank (36) with a first end pivotally mounted on the adjuster (35) and a second end pivotally mounted on the lower beam (33); and
   a seat (50) mounted on the second connector (34),
   wherein the second connector (34) has a chamber (341) facing the first end of the shank (36), the adjuster (35) has a block (351) received in the chamber (341), a finger (353) mounted on the second connector (34) and a bolt (352) extending through the finger (353) and engaged in the block (351), and the first end of the shank (36) is pivotally mounted in the block (351),
   a redirector (40) provided between the arm (30) and the seat (50), wherein the second connector (34) has a shaft (342) extending downwards from the second connector (34); the redirector (40) has a shell (42) mounted at a lower end of the shaft (342), a post (41) rotatably received in the shell (42) and having at least one protrusion formed on an outer periphery of the post (41), and a lower portion (415) of the post (41) extending out from the shell (42), and a button (43) provided in the shell (42) and formed with a stop (431) abutting the outer periphery of the post (41); and the seat (50) is pivotally mounted on the lower portion (415) of the redirector (40),
   wherein the holder (10) has a wire bracket (14) provided in the rod (13), and a channel (321) is longitudinally defined in the upper beam (32),
   wherein the wire bracket (14) is covered with a first cap (16) and the channel (321) is covered with a second cap (37),
   wherein the holder (10) has a first barrel (11) formed at the first end of the holder (10), a first lug (111) formed at a top circumference of the first barrel (11), a cylinder (15) secured on the ceiling and pivotally mounted with the first barrel (11), a second lug (151) formed at a lower circumference of the cylinder (15) and opposed to the first lug (111), a second barrel (12) formed at the second end of the holder (10), and a third lug (121) formed at a lower circumference of the second barrel (12); and the first connector (31) has a tube (311) rotatably mounted on the second barrel (12) by an axle (17) and a fourth lug (312) formed at a top circumference of the tube (311) and opposed to the third lug (121).

8. The support apparatus as claimed in claim 7, wherein the post (41) has a foot (416) formed on a lower portion (415), and the seat (50) is pivotally mounted on the foot (416).

* * * * *